United States Patent
Massoumi et al.

(10) Patent No.: US 9,804,756 B2
(45) Date of Patent: Oct. 31, 2017

(54) COMPARATIVE DATA ANALYTICS AND VISUALIZATION TOOL FOR ANALYZING TRAFFIC PERFORMANCE DATA IN A TRAFFIC MANAGEMENT SYSTEM

(71) Applicant: ITERIS, INC, Santa Ana, CA (US)

(72) Inventors: Ramin Massoumi, Rossmoor, CA (US); Alan Clelland, Santa Ana, CA (US)

(73) Assignee: ITERIS, INC., Santa Ana, CA (US)

( * ) Notice: Subject to any disclaimer, the term of this patent is extended or adjusted under 35 U.S.C. 154(b) by 499 days.

(21) Appl. No.: 14/499,093

(22) Filed: Sep. 27, 2014

(65) Prior Publication Data

US 2015/0095830 A1 Apr. 2, 2015

Related U.S. Application Data

(60) Provisional application No. 61/883,233, filed on Sep. 27, 2013.

(51) Int. Cl.
*G06F 3/0484* (2013.01)
*G08G 1/01* (2006.01)
*G09B 29/00* (2006.01)

(52) U.S. Cl.
CPC ......... *G06F 3/04842* (2013.01); *G08G 1/012* (2013.01); *G08G 1/0112* (2013.01); *G08G 1/0116* (2013.01); *G08G 1/0129* (2013.01); *G08G 1/0145* (2013.01); *G09B 29/007* (2013.01)

(58) Field of Classification Search
CPC . G06F 3/04842; G08B 1/0112; G08B 1/0116; G08B 1/012; G08B 1/0129; G08B 1/0145; G08B 1/0104; G08B 1/0125; G09B 29/007
USPC .................................................. 701/117, 119
See application file for complete search history.

(56) References Cited

U.S. PATENT DOCUMENTS

| | | | | |
|---|---|---|---|---|
| 8,781,716 B1 * | 7/2014 | Wenneman | ........ | G01C 21/3484 701/118 |
| 2004/0143385 A1 * | 7/2004 | Smyth | .................. | G08G 1/0104 701/117 |
| 2006/0253245 A1 * | 11/2006 | Cera | .................... | G06F 3/04815 701/117 |
| 2007/0038362 A1 * | 2/2007 | Gueziec | ............. | G01C 21/3492 701/117 |
| 2011/0224893 A1 * | 9/2011 | Scofield | ............. | G01C 21/3492 701/119 |
| 2012/0296559 A1 * | 11/2012 | Gueziec | ............... | G08G 1/0112 701/117 |

(Continued)

*Primary Examiner* — Bao Long T Nguyen
(74) *Attorney, Agent, or Firm* — Lazaris IP

(57) ABSTRACT

A comparative traffic data analytics framework and visualization tool utilizes multiple data processing functions to manipulate traffic information from a plurality of sources and enable users to configure comparative analyses in a dashboard-style format for arterial and intersection performance monitoring and management. The comparative visualization tool provides a plurality of user-configurable functions to view corridor travel and delay times, an animated map, overall network statistics, and intersection performance using a graphical user interface to guide decision-making processes for traffic management in an arterial transportation network.

23 Claims, 3 Drawing Sheets

(56) References Cited

U.S. PATENT DOCUMENTS

2014/0324327 A1* 10/2014 Aragon ................ G01C 21/26
701/117

* cited by examiner

COMPARATIVE DATA ANALYTICS AND VISUALIZATION TOOL FOR ANALYZING TRAFFIC PERFORMANCE DATA IN A TRAFFIC MANAGEMENT SYSTEM

CROSS-REFERENCE TO RELATED PATENT APPLICATIONS

This patent application claims priority to U.S. provisional application 61/883,233, filed on Sep. 27, 2013, the contents of which are incorporated in their entirety herein.

FIELD OF THE INVENTION

The present invention relates to comparative traffic analytics for measuring and monitoring arterial and intersection performance in a transportation network. Specifically, the present invention relates to manipulating traffic data and enabling a presentation of comparative traffic data analytics in a traffic management system for the purpose of applying such performance of traffic data to provide solutions for congestion problems in a transportation network.

BACKGROUND OF THE INVENTION

Emerging methods of collecting traffic information have produced an explosion in the amount of data available for analyzing traffic conditions. Among these emerging data collection methods are, for example, the ubiquitous use of mobile devices having applications configured thereon, and devices that generate traffic-related information such as global positioning systems (GPS) and Bluetooth communication systems. Each of these is capable of providing relevant information about traffic conditions. Additionally, other known systems such as video, radar, and traffic sensors also generate large amounts of traffic data. Together, all of this data enables advanced tools for processing and analyzing traffic conditions.

This vast amount of data has created a need for an automated, easy-to-use mechanism to access traffic information and present it in usable form for personnel responsible for traffic network management. There is presently no known system and method of automating the manipulation of traffic data to transform raw information into comparative analytics that improve the decision-making process for traffic management systems in an easy-to-use, configurable visualization tool. The current paradigm of acquiring, processing, and using information that focuses on devices, people, and information, is moving to automated means focusing on data, systems, and decisions, and there is a need in the art for automated systems and methods of enabling this paradigm shift for efficient comparative analytics for management of arterial transportation networks.

The ever-increasing amounts of data, demand improvements in ways to make sense of the information being collected and to enable more sophisticated performance monitoring of arterial transportation networks. For example, cities need to improve systems to better understand overall network performance. There is therefore a need for a system and method of assessing yearly, monthly, seasonal, and even daily or hourly variations in traffic conditions using real-time and historical speed, volume, capacity, incidents, and level-of-service (LOS) data, and there is also a need for using such data to assess the health of the entire transportation network (such as freeways, highways, and arterial or feeder segments) for which an agency or entity is responsible.

There is a further need for traffic data analytics that go beyond traditional "intersection LOS" methods that focus on improving conditions in the most heavily-congested areas and realization of savings in commuter time and fuel costs, both of which increase economic activity for the area(s) in which such transportation networks operate. There is an additional need to develop congestion analytics that enable traffic performance metrics such as a "state of the city" report card, which helps cities to better compete for regional funding.

BRIEF SUMMARY OF THE INVENTION

It is therefore one objective of the present invention to provide a system and method of enabling comparative traffic data analytics. It is another objective of the present invention to improve decision making by aggregating traffic data and presenting it in a usable format so that users can easily view the comparative data analytics performed. It is yet another objective of the present invention to provide a system and method of automating such decision-making by enabling systems to ingest traffic-related data and integrate comparative analytics in a plurality of data processing modules to generate output data for presentation in one or more interconnected widgets in a dashboard-style format and interface for ease of use and manipulation. It is yet another objective of the present invention to provide a system and method of comparative analytics of traffic data in a web-based visualization tool that enables efficient and fast solutions to congestion problems experienced in the transportation network.

The present invention discloses a system and method of using traffic data to improve the management of a transportation network that ingests and processes relevant traffic data and enables a comparative analysis to generate output data in a plurality of easily-configurable tools to provide a better understanding of the performance of, and management of, a transportation network. In one exemplary embodiment, the present invention discloses a web-based analytics and visualization tool that accesses traffic data from a plurality of sources and enables users to configure multiple data processing analytics in one or more data processing modules to provide output data to guide a decision-making process for traffic management. This web-based analytics and visualization tool provides an easy-to-use comparison of traffic data that allows users to monitor and measure the health of roadways comprising a transportation network. In addition to traffic data collected from native or directly-maintained detection networks, the present invention also permits ingest and consumption of data from third-party sources such as Bluetooth devices, GPS devices, and agency-owned detection data.

The present invention also enables users to quickly identify traffic trend and hot spots using such traffic performance data, and compare travel times for network-wide or corridor-specific segments. These may be accomplished across any time frame desired by the user, such as for example month-on-month, season-on-season, or year-on-year. The present invention also enables export of information to additional modeling and simulation tools, and before-and-after studies to evaluate additional investments for a transportation network.

Other embodiments, features and advantages of the present invention will become apparent from the following description of the many embodiments, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

Figure 1:
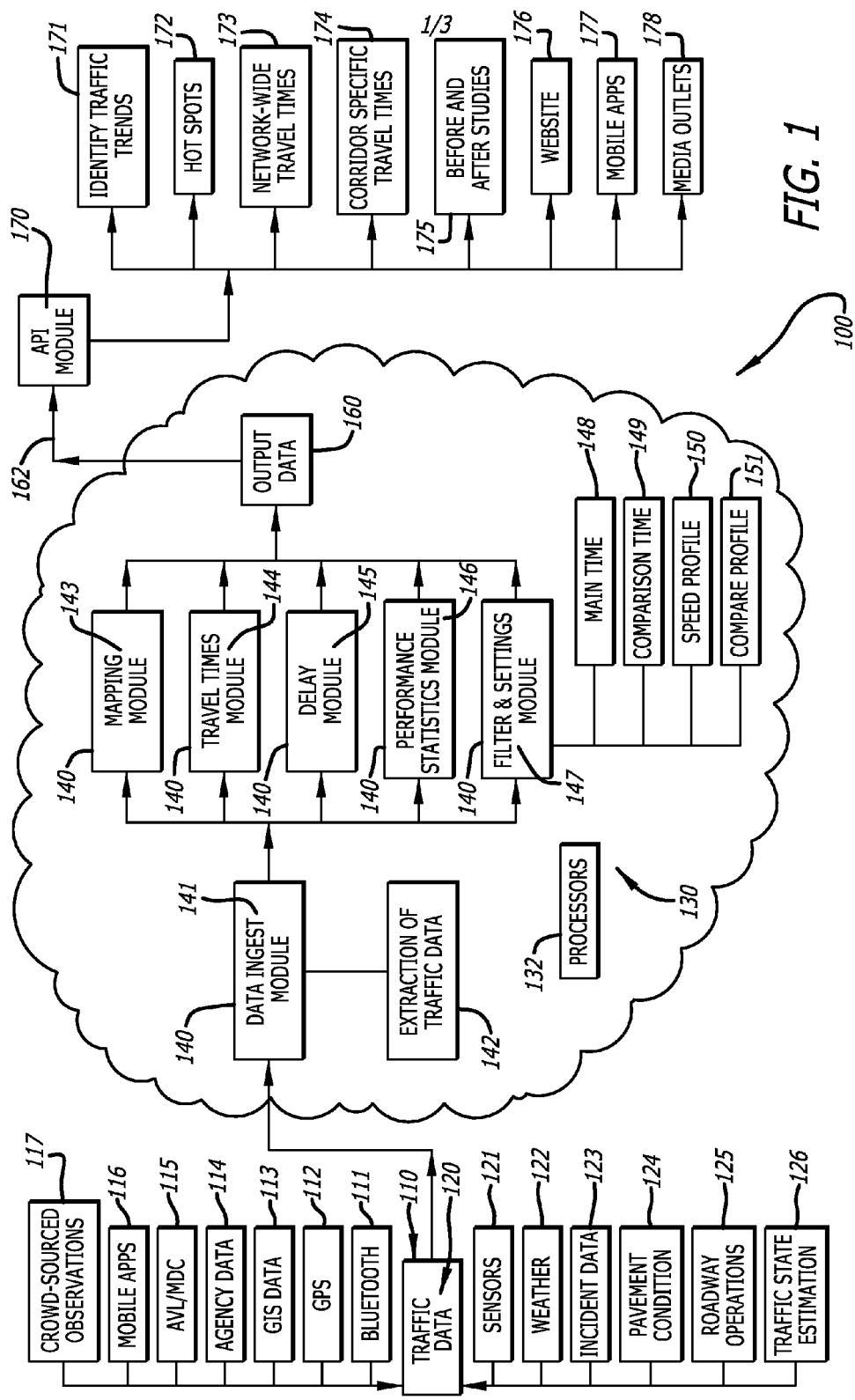
FIG. 1 is a block diagram of a system and method of comparative traffic data analytics for monitoring and measuring transportation infrastructure according to the present invention.

FIG. 1 is a block diagram of components in a comparative traffic data analytics visualization framework 100, which performs arterial performance monitoring and intersection performance monitoring for maintaining and measuring transportation infrastructure health. These components together comprise one or more systems and methods of performing the comparative traffic data analytics visualization framework 100 of the present invention.

The comparative traffic data analytics visualization framework 100 ingests and consumes input data 110 in the form of traffic data 120. Traffic data 120 is representative of traffic performance on at least one segment of a roadway network. This input data 110 may also include general traffic information collected from one or more sensors 121 (for example, from cameras, radar, probes, or loops), weather data 122, incident data 123, pavement condition data 124, roadway operations data 125, and data generated by one or more integrated traffic state estimation systems 126 which incorporate at least some these categories of data to model traffic on a transportation infrastructure network. Traffic data 120 may also be derived from multiple types of input data 110 reflecting or representing traffic conditions on a particular section of roadway. These multiple categories of input data 110 may include other types of information acquired from various third-party devices sources. Examples of such sources include Bluetooth devices 111, GPS devices 112 that provide geographical information system (GIS) data 113 of spatio-temporal location of traffic, and agency-owned detection data 114. Other sources include AVL/MDCs 115, mobile applications 116 resident on mobile devices such as "smart" phones or tablets, and crowd-sourced observations or social media feeds 117 (such as those generated on the basis of, for example, real-time observations of motorists using a roadway). Input data 110 may also include historical, representative of real-time conditions over a specific time period, or predictive of a future traffic state. Input data 110 may be ingested into the comparative traffic data analytics visualization framework 100 in response to one or more instructions to manipulate traffic information based on user commands provided via a graphical user interface, or may be ingested on a continual basis and maintained in one or more database collections and accessed when such user commands are provided.

The comparative traffic data analytics visualization framework 100 in the present invention is performed according to, and is comprised of in one aspect thereof, a broad computing environment 130 that includes software and hardware components such as one or more processors 132, configured to execute program instructions in one or more data processing modules 140 configured to generate traffic performance metrics and present them as widget-style indicia for traffic management decision-making. These modules 140 include a data ingest module 141 configured to receive a plurality of input data 110 of the many different types and from many different sources as described above. The data ingest module 141 may be configured to perform an extraction 142 of traffic data 120 from the various types of input data 110 ingested into the present invention. The software and hardware components, program instructions, and one or more data processing modules 140 may all be portions of the broad computing environment 130 configured to perform the various aspects of the present invention.

The one or more data processing modules 140 may further include modules for performing various actions within the framework 100 of the present invention. These may include a mapping module 143, a travel times calculation module 144, a delay calculation module 145, a performance statistics module 146, and a filters module 147. The filters module 147 performs a number of additional functions based on user-configurable settings in one or more sub-modules, such as main time translation module 148, comparison time translation module 149, a speed profile translation module 150, and compare profile translation module 151. Each of these modules contributes to generating output data 160 at least in the form of traffic performance data 162. Such traffic performance data 162 may be further provided to one or more application programming interface modules 170 for further modeling, simulation, or distribution. Such further modeling and simulation may be performed by one or more tools to identify traffic trends 171 and hot spots 172 using such traffic performance data 162, compare network-wide travel times 173 or travel times for corridor-specific segments 174, and conduct before-and-after studies 175 to evaluate additional investments for a transportation network. Traffic performance analytics data 162 for each of these applications, and generally, may be further configured for distribution and/or display with third party platforms, such as for display on a website 176, via a mobile application 177, or by entities such as media outlets 178.

Figure 2:
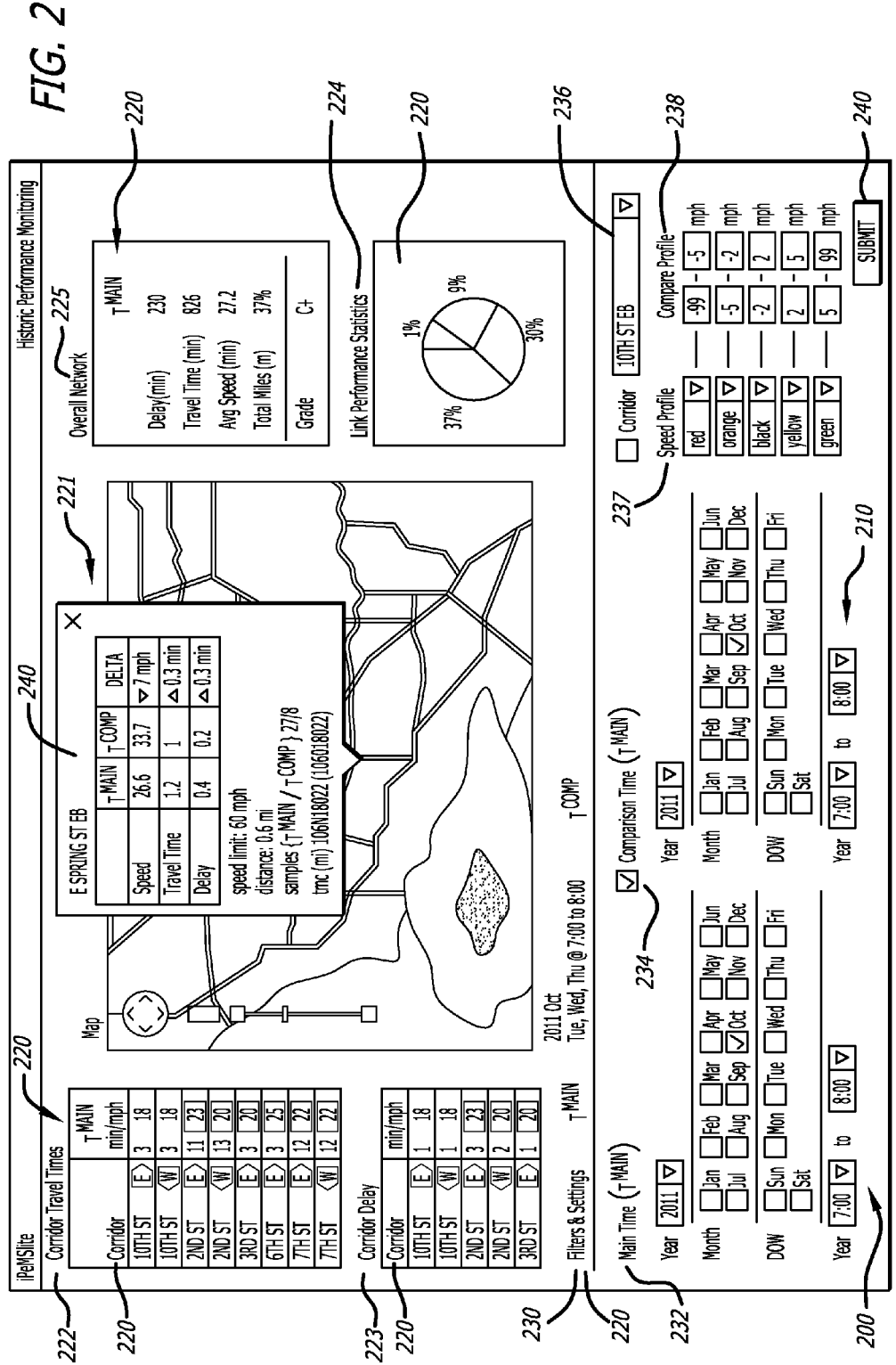
FIG. 2 is an exemplary illustration of a visualization tool for evaluating the comparative traffic data analytics according to one aspect of the present invention.

The present invention, as noted above, provides a framework 100 for monitoring performance and health of a transportation infrastructure network using a web-based comparative visualization tool 200 for performing and viewing analytics of traffic data. FIG. 2 below is an example illustration of such a comparative visualization tool 200. The comparative visualization tool 200, in one embodiment thereof, provides a dashboard-style interface 210 that includes a plurality of indicia that are displayed in a presentation of widget-style graphics 220 that includes one or more of a map 221 showing an animated transportation network, indicia 222 displaying "Corridor Travel Times", indicia 223 displaying "Corridor Delay", indicia 224 displaying "Link Performance Statistics", and indicia 225 titled "Overall Network" which displays overall network performance statistics together with an associated grade. FIG. 2 also shows an arrow that a user may click on or maneuver in a "touch" format to maximize or minimize a "Filters and Settings" section 230, discussed further herein.

The widget-style graphics 220 and related indicia described herein are presented in the comparative visualization tool 200 via an easy-to-use graphical user interface 210 that allows users to quickly configure the present invention to their needs for managing arterial transportation networks. The comparative visualization tool 200 may be configured so that traffic performance data 162 may be organized and represented in a variety of different schematic forms and formats on the graphical user interface, such as for example the dashboard-style interface 210 shown in FIG. 2, and it is to be understood that the present invention is not to be limited to any one form or format referenced or shown herein. Users may access the comparative visualization tool 200 from any location, and from any type of device, including but not limited to a desktop computer, laptop computer, tablet computer, wearable device, a "smart" phone, or any other mobile computing and/or telephony apparatus, and the comparative visualization tool 200 may be configured for use with any such device. Therefore the present invention is not to be limited by the device or operating system used to access, configure, or utilize the comparative visualization tool described herein.

As noted above, the comparative visualization tool 200 includes a Filters and Settings section 230 that enables users, via one or more user-configurable functions, to specify a Main Time 232, a Comparison Time 234, a Corridor 236, and one or both of a Speed Profile 237 and a Compare Profile 238. User-configurable functions in the comparative visualization tool 200 may include pull-down menus from which users can select from available numerical and textual information, data entry or "check" boxes in which users can manually enter either check marks or actual numeral or textual data, and at least one "Submit" section 240 which users can select using a mouse, track pad, via touching a screen, or any other method of pressing a virtual "button."

The Speed Profile widget 237 allows the user to set thresholds (in mph or kph) and colors in which speed data will be displayed on the Animated Map 221 and the other sections on the dashboard-style presentation 210 on the graphical user interface. The Compare Profile widget 238 allows the user to set thresholds (in mph or kph) and colors for which comparisons will be displayed on the Animated Map 221 and the other widget-style graphics 220.

One or more of the widget-style graphics 220 may be manipulated to produce a pop-up style display in which an enlarged box or window 250 is presented as an overlay, for example on the Animated Map 221 in FIG. 2. Where the window is presented on the Animated Map 221, it may indicates speed, travel time, and delay details for a particular corridor or segment of an arterial transportation network. This per-corridor detail may be actuated by the user hovering a pointer over a portion of the Animated Map 221 (or any other of the widget-style graphics 220 for which such a manipulation is possible), by clicking on a particular corridor on the Animated Map 221 for which detailed information is desired, by hovering a pointer over (or clicking on) indicia in other graphical widgets 220 for a specific corridor, or by any other method of calling up further detail from either the Animated Map 221 or any other of the widget-style graphics 220. The user may also be able to configure the details in shown in the enlarged box/window, and one or more pull-down menus or links may be further available within the enlarged box for accessing additional information about the corridor being viewed.

The comparative visualization tool 200 may further be configured to display expanded sections for Corridor Travel Times 222, Corridor Delay 223, Link Performance Statistics 224, and Overall Network 225 with additional data. This additional data is comparative data that has been instructed using the Filters and Settings section 230. The comparative visualization tool 200 may further display the user-selected data from the time periods in the Main Time 232 and Comparison Time 234 widgets, so that a user can visually compare data from these time periods to draw inferences therefrom and make management decisions regarding the transportation network. Further detail about the calculations performed to arrive at information displayed in each section is provided below.

Figure 3:
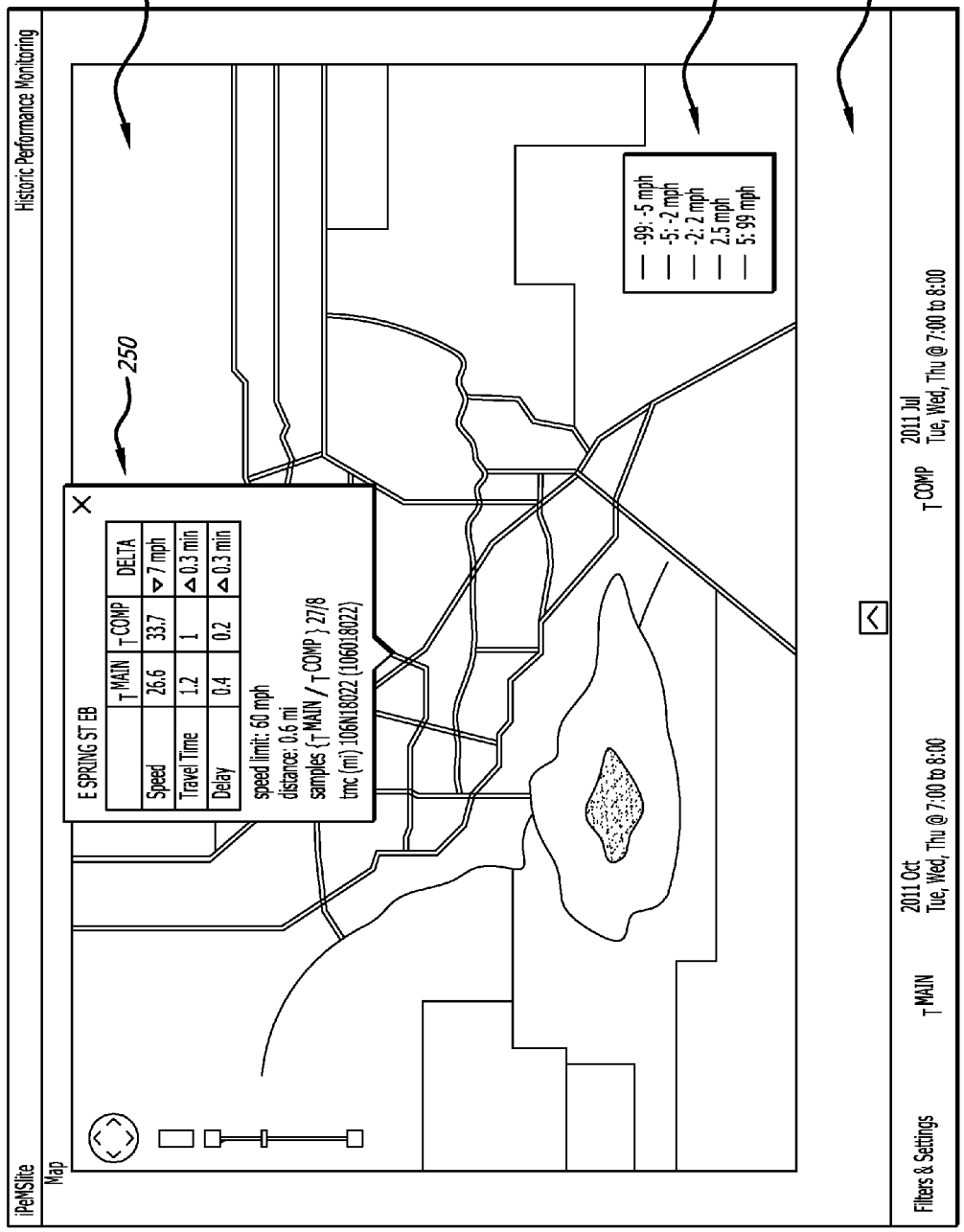
FIG. 3 is another exemplary illustration of the visualization tool according to another aspect of the present invention.

The Animated Map portion 221 of the comparative visualization tool 200 is generated by the mapping module 141. FIG. 3 is another exemplary illustration of the dashboard interface 210 of the comparative visualization tool 200, in which the Animated Map portion 221 is shown enlarged to cover the entire dashboard viewing area. In FIG. 4, the arterial transportation network is shown as a portion of a map of the wider area in which the network is located. Therefore, it is contemplated that least the Animated Map portion 221 of the comparative visualization tool 200 may be enlarged by the user to cover a substantially larger viewing area of the interface 210 than that shown in FIG. 2. Another window indicating coding for corridor/segment colors and speed information represented by each color may also be displayed in such an enlarged view of the Animated Map 221.

This enlarged Animated Map 221 is accessed by the user by touching or hovering a pointer over of clicking a link represented by "Expand Map" textual indicia (or other language indicative of enlarging the map) on the dashboard interface 210. The user may minimize the Animated Map shown in FIG. 3 back to the sizes shown in FIG. 2 by touching or hovering a pointer or clicking on "Collapse Map" textual indicia, or other such indicative language.

As noted above, a Corridor Travel Times section 222 of the comparative visualization tool 200 of the present invention may be provided as widget-style graphical indicia 220 to provide an indication of corridor-specific analytics. Travel time statistics shown in this Corridor Travel Times section 222 of the comparative visualization tool 220 for each corridor are calculated as follows by the travel times calculation module 142. A corridor's travel time is defined as the time it takes to traverse across the corridor. Each corridor's travel time is calculated by summing the travel time of all map links, representing segments, comprising the corridor. A map link's travel time is calculated as distance divided by speed. Therefore, the travel times calculation module 142 executes mathematical functions to manipulate existing distance and speed information using historical data to arrive at a travel time for each map link, and then sums the travel times for each map link to arrive at the travel time for the corridor selected. The "Corridor Travel Times" section 222 displays an identifier for each corridor indicated, the direction of data being displayed, and for each of the Main and Comparison time periods 232 and 234, the number of minutes and the speed used in the calculation. A user of the comparative visualization tool 200 of the present invention can therefore quickly visualize a comparative analysis of travel statistics for different time periods.

As also noted above, a Corridor Delay section 223 of the comparative visualization tool 200 may be provided as widget-style graphical indicia 220 to provide an indication to a user of delay from an average speed and travel time. Corridor delay is defined as the extra time needed to travel the distance of the corridor compared to the free flow travel time, and may be calculated by the corridor delay calculation module 143. Free flow travel time may be the speed limit for one or more segments of the corridor, but it may also be, for example, average off-peak speed or any other measure of free flow movement of traffic. It is to be understood, however, that free flow travel time may also be defined as needed by the user.

Regardless, the delay is calculated by subtracting the travel time based on the free flow speed from the travel time based on an average speed. The corridor delay calculation module 143 therefore executes mathematical functions to calculate delay information using historical data to arrive at a travel time using an average speed, and then subtracts from that the travel time using the above calculation (distance divided by free flow speed) to arrive at the travel time for the corridor selected. Similar to the Corridor Travel Times section 222, the Corridor Delay section 223 as shown in FIG. 2 displays an identifier for each corridor indicated, the direction of data being displayed, and for each of the main and comparative time periods, the number of minutes of delay and the speed. A user of the comparative visualization tool 200 of the present invention can therefore quickly visualize a comparative analysis of delay statistics for the different time periods selected.

The comparative visualization tool 200 of the present invention also includes, as noted above, a Link Performance section 224 and an Overall Network section 225 that each present various statistics for the arterial transportation network to the user. Such statistics are created by mathematical functions executed by the performance statistics module 144. One such statistic is total delay, which is calculated by summing the delay of all map link segments that make up the entire arterial transportation network. Similarly, total travel time is calculated by summing the travel time of all map link segments that make up the entire arterial transportation network, and overall average speed is calculated by dividing the total distance of all map links by the total travel time. The Overall Network section 225 may also include a total miles statistic, which is calculated by summing the distance of all map link segments in the arterial transportation network.

The Link Performance section 224 provides a graphical color-coded chart showing the speed information represented in the different colors identified in the Filters and Settings section. The chart shows the speed information as percentages of the overall network exhibiting the speed ranges covered by each color. For example, in FIG. 2, 44% of the overall network is currently exhibiting speeds in the range identified for one color. It should be noted that although this portion of FIG. 2 is shown in a pie chart, other formats may also be used to present such information.

An overall network grade in one of the Link Performance section 224 or Overall Network section 225. The overall network grade is defined as the percentage of the average speed divided by the speed limit based, on the exemplary scale below:

| Grade | Percentage Scale |
| --- | --- |
| A+ | >100 |
| A | >90 to <=100 |
| A- | >85 to <=90 |
| B+ | >82 to <=85 |
| B | >78 to <=82 |
| B- | >75 to <=78 |
| C+ | >70 to <=75 |
| C | >60 to <=70 |
| C- | >50 to <=60 |
| D+ | >45 to <=50 |
| D | >40 to <=45 |
| D- | >30 to <=40 |
| F | <=30 |

It should be noted that this scale can be configured as needed by the user, and therefore the present invention is not to be limited by the letters or numbers indicated therein in any way.

As noted above, the Filters and Settings section 230 includes time and comparison indicia, via the dashboard interface 210 of the comparative visualization tool 200, that enable a user to select points or spans in time within which to compare historical traffic data for an arterial transportation network in the widget-style graphical indicia 220, and for displaying data in the Animated Map 221. The filters module 147, together with its one or more sub-modules (main time translation module 148, comparison time translation module 149, a speed profile translation module 150, and compare profile translation module 151) accepts these user-provided inputs and translates them for instructions for others of the widget-style graphical indicia 220 to display the other information as selected by the user.

In the Main Time portion 232, a user may select a first time period (using pull-down menus or check boxes indicative of years, months, days of the week, and times) for a main period of analysis of historical traffic data, and in the Comparison Time portion 234, a second time period (using the same type of pull-downs and check boxes, as shown) for a comparative time period to the main one. Based on the two time periods selected for comparison, the widget-style graphics 220 are configured to show differences in conditions between the two time periods, either side-by-side or using any other easy-to-read format.

The Corridor section 236, Speed Profile section 237 and the Compare Profile section 237 described above are portions of the Filters and Settings section 230 through which the user can set the speed threshold and colors for the comparative visualization tool 200 to generally display on the Animated Map 221 other widget-style graphics 220. Such flexibility enables the user to highlight areas on the Animated Map 221 easier, as well as fine-tune the color variations so as to capture distinctions in traffic conditions in different segments of the arterial transportation network.

The present invention executes the mathematical functions described herein in a plurality of data processing modules that are configured to access, as input data 110, traffic data 120 based on parameters indicated by a user in one or more widget-style graphics 220, and to generate as output data 160 the resultant traffic performance analytics data 162 in either a singular or a comparative form in one or more other widget-style graphics 220 in the dashboard interface 210 of the comparative visualization tool 200. These one or more data processing modules 140 execute a plurality of instructions to carry out the mathematical functions described herein by ingesting the traffic data 120 and carrying out the mathematical processes to populate the other sections of the dashboard interface 210 and display the required information. Accordingly, traffic data 120 is transformed from one form to another for the time periods selected by the mathematical functions described herein to produce the output data 160 that enables a comparison of traffic information across differing time periods to enhance decision-making for traffic management systems.

The traffic data 120 ingested into the present invention may be provided in a variety of formats, and from many different sources. It may be organically or natively collected or derived, or provided by third parties, or both. Accordingly the present invention is not intended to be limited by any type or source of traffic data 120 to be ingested for performing the data manipulation and transformation functions discussed herein.

The dashboard-style interface 210 of the comparative visualization tool 200 in which traffic performance analytics data 162 as described herein are presented may also include the ability to access additional data when a user performs mouse-over, cursor-over, or touch movements in or near the various widget-style graphical indicia 220. The user may therefore access further information by simply touching the graphical user interface or by positioning a cursor or pointer, using a mouse, track pad, or other means, over particular indicia in any of the widget-style presentations on the dashboard 210. For example, a user wishing to learn more about how data is calculated may move the cursor over that set of data to call up a further "Help" or "More" link to further information about the analytics performed.

The dashboard-style interface 210 may also further include animation controls that allow the user to view an animation of the map 221, for example of the current day, anywhere from midnight to a most recent time, or other specified time period. Other animation controls may also be implemented within the animated map portion 221 of the dashboard-style interface 210, such as for pause, forward, reverse, sound, and playback functions. This may be configured so that the animation may play out on the animated map 221 itself or in a separate pop-up window.

In a further embodiment of this aspect of the present invention, users may be able to access further traffic data 120 by moving the cursor or pointer over particular indicia in the dashboard 210 (or by swiping or touching the graphical user interface). For example, users who are currently viewing data for a particular day may be able to access data for a previous day by moving the mouse or cursor over that data, and entering a data into a dialog box which appears after moving the mouse or cursor over that data. Users may therefore be able to customize additional presentations of data simply by moving the mouse or cursor (or manipulating a touch screen) over existing widgets or indicia. In still another embodiment, when the animated map 221 is in playback mode, users may be able to access additional playbacks of traffic performance analytics data 162 by the mouse-over activity described herein. Users may therefore be able to view concurrent playbacks to compare current conditions with historical data, for example in separate pop-up windows. It is therefore contemplated that the dashboard-style interface 210 of the present invention may be configured to present additional information not immediately visible by selecting the main and comparative time periods, and that any type of additional data analyzed by the traffic management system of which the comparative visualization tool of the present invention is part thereof may be available in such a manner.

The present invention may include a weather data integration feature that enables weather information to be incorporated into one or more of the data processing functions discussed herein. Because weather may be a factor in traffic speed, location and flow on a roadway, the present invention contemplates that weather data 117 from one or more sources of such information is one example of data that may be used to extract traffic data for a roadway link or segment.

The weather data integration feature is therefore configured to ingest weather data 117 for the segments or corridors to be analyzed in the present invention. Such weather data 117 may be ingested from instruments such as weather sensors or from weather analysis and prediction systems, and from non-traditional sources of information such as for example from crowd-sourced observations and social media feeds. The different sources of weather data 117 may include data from both in-situ and remotely-sensed observation platforms. For example, weather station data may be combined with data from weather radars, satellites, and computer models to reconstruct the current weather conditions on any particular link, segment or corridor of roadway. Additionally, the present invention may be configured to ingest data representative of weather variables from numerical weather prediction (NWP) models, regardless of whether publicly, privately, or internally provided or developed.

In another aspect, the comparative traffic data analytics visualization framework 100 may also include intersection performance monitoring, which complements the arterial performance monitoring function of the present invention with intersection-level information. Such intersection-level information may include volume data, capacity information, and intersection timing information. Intersection performance monitoring is performed by an intersection performance module among the data processing modules 140 which applies one or more mathematical functions to manipulate such data to compute and present several intersection performance statistics. These intersection performance statistics include percent arrival on green and intersection delay, and are vital to understanding how the overall arterial network is operating, as well as understanding transportation infrastructure health.

Volume data, capacity information, and intersection timing information is detector-derived data extracted from component(s) coupled to a traffic signal controller, such as those housed within a controller cabinet at or near a traffic intersection. In addition to the statistics noted above, intersection performance monitoring within the present invention performs analytics to derive several additional traffic performance metrics in real time, and configures such real-time metrics for presentation to the user in the dashboard-style interface 210 of the comparative visualization tool 200. Examples of these traffic performance metrics include:

timelines of flow data per phase, for time periods specified by the user (for example since midnight);
  total flow data in the intersection, for time periods specified by the user (for example since midnight);
  current volume-to-capacity (V/C) ratios for recent intersection controller cycles;
  saturation flow rate;
  previous V/C rations per phase, for user-selected time periods;
  % of vehicles arriving on green lights;
  % of vehicles arriving on red lights; and
  calculation of delay per approach.

Each of these performance metrics may be presented in widget-style graphics 220 on the dashboard-style interface 210 of the comparative visualization tool 200.

Additionally, one or more animations may generated by the intersection performance monitoring function and module of the present invention. One example of such as an animation is one of vehicle arrivals per signal phase. This may be presented on the animated map 221 or in other implementations of a map on the dashboard-style interface 210, and may include details such as an iconic representation of individual vehicles.

The systems and methods of the various embodiments of the present invention may be implemented in many different computing environments 130. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method of visualizing comparative traffic performance analytics, comprising:
within a computing environment comprised of a computer processor and at least one computer-readable storage medium operably coupled to the computer processor and having program instructions stored therein, the computer processor being operable to execute the program instructions to perform the steps of:
accessing, as input data, traffic data representative of one or more characteristics of traffic performance on at least one segment of a roadway network;
applying the input data to a plurality of data processing modules configured to present the traffic data as a plurality of performance metrics for traffic management decision-making, the plurality of data processing modules performing one or more mathematical functions on the input data to compare traffic data from a first time period with traffic data from a second time period on the at least one segment of a roadway network, the one or more mathematical functions applied based on user commands provided via a graphical user interface to generate 1) a corridor travel time defined as a time to traverse across a selected corridor, 2) a corridor delay defined as extra time needed to travel a distance of the selected corridor compared to a free flow travel time, and 3) one or more statistics representing traffic performance for the roadway network, the one or more statistics including total delay, total travel time, and overall average speed, and a network grade; and generating, as output data, widget-style indicia enabling a visual comparison of the plurality of performance metrics from the first time period to the second time period, and displaying the widget-style indicia on the graphical user interface, the widget-style indicia at least including an animated map, travel time statistics representing the corridor travel time, delay statistics representing the corridor delay, and link performance statistics representing traffic performance for the roadway network.

2. The method of claim 1, wherein the accessing the input data occurs in response to one or more instructions to manipulate the plurality of performance metrics for traffic management decision-making based on the user commands provided via the graphical user interface.

3. The method of claim 1, wherein the accessing the input data further comprises ingesting traffic-related data from a plurality of sources that include one or more of sensors, weather instruments, incident data, pavement condition data, roadway operations data, and traffic state estimation.

4. The method of claim 1, wherein the plurality of data processing modules includes a filters and settings module configured to enable a user to select one or more of an initial time period, a compare time period, a corridor representing the at least one segment of the roadway network, and profile configurations for a display of comparisons of traffic speed.

5. The method of claim 1, wherein the plurality of data processing modules includes a mapping module configured to generate an animated display of the plurality of performance metrics on a map of the at least one segment of the roadway network, the plurality of performance metrics at least including a traffic speed.

6. The method of claim 1, wherein a free flow travel time is at least one of a speed limit for one or more segments comprising the corridor, and an average off-peak speed.

7. The method of claim 1, wherein the widget-style indicia enable identification of traffic trends and traffic hot spots from the plurality of performance metrics.

8. The method of claim 1, wherein the plurality of data processing modules further comprises an intersection performance monitoring module configured to generate intersection performance statistics that include percent arrival on green and intersection delay.

9. The method of claim 8, wherein the widget-style indicia include visual comparison of intersection performance metrics that include one or more of flow data per intersection signal phase, volume-to-capacity ratios for recent intersection controller cycles, percentages of vehicles arriving on green lights and percentages of vehicles arriving on red lights, a delay per approach calculation, and an animation of vehicle arrivals per signal phase.

10. A system comprising:

a data ingest module configured to access, as input data, traffic data representative of one or more characteristics of traffic performance on at least one segment of a roadway network;

a plurality of data processing modules configured within a computing environment comprised of a computer processor and at least one computer-readable storage medium operably coupled to the computer processor and having program instructions stored therein, the computer processor being operable to execute the program instructions to perform mathematical functions to manipulate the input data to compare traffic data from a first period to traffic data from a second period and transform the traffic data representative of one or more characteristics of traffic performance on at least one segment of a roadway network into visualized comparative performance metrics for traffic management decision-making, the plurality of data processing modules including:

a mapping module configured to generate an animated display of a plurality of performance metrics on a map of the at least one segment of the roadway network, the plurality of performance metrics at least including a traffic speed;

a travel times module configured to calculate a corridor travel time defined as a time to traverse across a selected corridor;

a delay module configured to calculate a corridor delay defined as extra time needed to travel a distance of the selected corridor compared to a free flow travel time;

a link performance module configured to produce one or more statistics representing traffic performance for the roadway network, the one or more statistics including total delay, total travel time, and overall average speed, and a network grade;

a filters and settings module configured to enable a user to select one or more of an initial time period, a compare time period, a corridor representing the at least one segment of the roadway network, and profile configurations for a display of comparisons of traffic speed; and a graphical user interface module configure to convert the traffic data representative of one or more characteristics of traffic performance on at least one segment of a roadway network into one or more indicia for display in a dashboard-style interface for presentation to a user as the visualized comparative performance metrics for traffic management decision-making.

11. The system of claim 10, wherein the data ingest module accesses input data in response to one or more instructions to manipulate the visualized comparative performance metrics based on user commands provided via the dashboard-style interface.

12. The system of claim 10, wherein the data ingest module ingests the traffic data representative of one or more characteristics of traffic performance on at least one segment of a roadway network from a plurality of sources that include one or more of sensors, weather instruments, incident data, pavement condition data, roadway operations data, and traffic state estimation.

13. The system of claim 10, wherein the delay module applies a free flow travel time from at least one of a speed limit for one or more segments comprising the corridor, and an average off-peak speed.

14. The system of claim 10, further comprising an intersection performance monitoring module configured to generate intersection performance statistics that include percent arrival on green and intersection delay.

15. The system of claim 14, wherein the visualized comparative performance metrics for traffic management decision-making include intersection performance metrics including one or more of flow data per intersection signal phase, volume-to-capacity ratios for recent intersection controller cycles, percentages of vehicles arriving on green lights and percentages of vehicles arriving on red lights, a delay per approach calculation, and an animation of vehicle arrivals per signal phase.

16. A method comprising:

within a computing environment comprised of a computer processor and at least one computer-readable storage medium operably coupled to the computer processor and having program instructions stored therein, the computer processor being operable to execute the program instructions to perform the steps of:

extracting traffic data representative of one or more characteristics of traffic performance on at least one segment of a roadway network for at least two time periods as selected by a user via a graphical user interface;

calculating a corridor travel time defined as a time to traverse across a selected corridor by accessing a distance value and a speed value for roadway links comprising the selected corridor, and summing the time to traverse for the roadway links comprising the selected corridor;

calculating a corridor delay time defined as extra time needed to travel a length of the selected corridor compared to a free flow travel time by subtracting the time to traverse the selected corridor based on a specific free flow speed value from a travel time based on an average speed value;

calculating network-wide statistics representing traffic performance for the roadway network by summing, for each link in the roadway network, a total delay, a total travel time, and an overall average speed;

assigning a network grade of the traffic performance of the roadway network, the network grade comprising the average speed divided by a speed limit;

enabling a user to configure the at least two time periods to compare the traffic data representative of one or more characteristics of traffic performance on at least one segment of a roadway network via a plurality of user-selectable items on the graphical user interface;

generating an animated map showing color-coded indicia representing each corridor of the roadway network; and displaying the corridor travel time, the corridor delay time, the network-wide statistics, the network grade and the animated map on the graphical user interface.

17. The method of claim 16, wherein a free flow travel time is at least one of the speed limit for one or more segments comprising the corridor, and an average off-peak speed.

18. The method of claim 16, wherein the extracting traffic data representative of one or more characteristics of traffic performance on at least one segment of a roadway network further comprises accessing input data in response to one or more instructions to manipulate traffic performance metrics for traffic management decision-making based on user commands provided via the graphical user interface.

19. The method of claim 18, further comprising identifying traffic trends and traffic hot spots from the traffic performance metrics.

20. The method of claim 16, wherein the extracting traffic data representative of one or more characteristics of traffic performance on at least one segment of a roadway network further comprises ingesting input data from a plurality of sources that include one or more of sensors, weather instruments, incident data, pavement condition data, roadway operations data, and traffic state estimation.

21. The method of claim 16, further comprising filtering the corridor travel time, the corridor delay time, the network-wide statistics, the network grade and the animated map by enabling user selection of one or more of an initial time period, a compare time period, a corridor representing the at least one segment of the roadway network, and profile configurations for a display of comparisons of traffic speed.

22. The method of claim 16, further comprising monitoring intersection performance from one or more of volume data, capacity data, and intersection timing information, and generating intersection performance statistics that include percent arrival on green and intersection delay.

23. The method of claim 22, further comprising displaying intersection performance metrics as one or more of flow data per intersection signal phase, volume-to-capacity ratios for recent intersection controller cycles, percentages of vehicles arriving on green lights and percentages of vehicles arriving on red lights, a delay per approach calculation, and an animation of vehicle arrivals per signal phase.

* * * * *